US011294224B2

United States Patent
Matsushita

(10) Patent No.: US 11,294,224 B2
(45) Date of Patent: Apr. 5, 2022

(54) METHOD OF PRODUCING ROUND SHAPE DISPLAY INCLUDING POLARIZING PLATE

(71) Applicant: Sharp Kabushiki Kaisha, Sakai (JP)

(72) Inventor: Keigo Matsushita, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 184 days.

(21) Appl. No.: 16/838,210

(22) Filed: Apr. 2, 2020

(65) Prior Publication Data

US 2020/0319505 A1    Oct. 8, 2020

Related U.S. Application Data

(60) Provisional application No. 62/829,085, filed on Apr. 4, 2019.

(51) Int. Cl.
   *G02F 1/1335*    (2006.01)
   *G02B 5/30*      (2006.01)

(52) U.S. Cl.
   CPC ......... *G02F 1/133528* (2013.01); *G02B 5/30* (2013.01); *G02F 1/133541* (2021.01); *G02F 2201/56* (2013.01)

(58) Field of Classification Search
   CPC ......... G02F 1/133528; G02F 1/133541; G02F 2201/56; G02B 5/30
   See application file for complete search history.

(56) References Cited

U.S. PATENT DOCUMENTS

| | | | |
|---|---|---|---|
| 2009/0128749 A1* | 5/2009 | Oono | G02F 1/133528 349/96 |
| 2017/0351019 A1* | 12/2017 | Kadowaki | G02B 6/0088 |
| 2018/0180912 A1* | 6/2018 | Nakanishi | G09F 9/00 |
| 2019/0107743 A1* | 4/2019 | Hasegawa | G02F 1/133512 |
| 2019/0310511 A1 | 10/2019 | Yamamoto | |

FOREIGN PATENT DOCUMENTS

WO    2018/012584 A1    1/2018

\* cited by examiner

*Primary Examiner* — Phu Vu
(74) *Attorney, Agent, or Firm* — Keating & Bennett, LLP

(57) ABSTRACT

Provided is a method of producing a round shape display including a polarizing plate. The round shape display is shaped circularly and has a front face provided with the polarizing plate. In a stated order, the method includes steps of: (a) producing a positioning panel from a material panel including the round shape display, the positioning panel being surrounded by a straight edge shaped linearly and a portion of an outer circumference of the round shape display; (b) positioning the positioning panel; (c) attaching the polarizing plate shaped circularly to the round shape display included in the positioning panel; and (d) removing a portion, of the positioning panel, including the straight edge, and producing the round shape display.

5 Claims, 14 Drawing Sheets

METHOD OF PRODUCING ROUND SHAPE DISPLAY INCLUDING POLARIZING PLATE

BACKGROUND

Field

The disclosure relates to a method of producing a round shape display including a polarizing plate.

Description of the Background Art

A polarizing plate is placed on the surface of a display to be used for such display devices as electronic devices including information terminals and as instruments provided to vehicles including cars. When this polarizing plate is attached to a display, a polarization axis of the polarizing plate needs to be accurately positioned in a predetermined direction with respect to the display panel.

However, if the display and the polarizing plate are both circular when the polarizing plate is attached to the display, the display is likely to circumferentially rotate such that the polarizing plate and the display might be circumferentially displaced (angularly displaced) in relation to each other. As a result, an optical property of the display deteriorates.

In order to overcome such a problem, for example, WO/2018/012584 proposes a technique to provide a recess and a protrusion in predetermined positions of a display and a polarizing plate, and fit the recess and the protrusion together so that the display and the polarizing plate are circumferentially positioned.

CITATION LIST

Patent Literature

[Patent Document 1] WO/2018/012584

SUMMARY

Technical Problem

However, with the above technique to provide parts dedicated to preventing displacement, the displacement prevention parts are left on the finished display with the polarizing plate attached thereto. The left parts cause such problems as adversely affecting quality of a readout, and increasing the size of the display device.

The disclosure is conceived in view of the above problems, and intends to provide a method of producing a round shape display including a polarizing plate which is less likely to cause displacement even if the display and the polarizing plate are both circular.

Solution to Problem (1) An embodiment of the disclosure is directed to a method of producing a round shape display including a polarizing plate, the round shape display being shaped circularly and having a front face provided with the polarizing plate. In a stated order, the method includes steps of: (a) producing a positioning panel, including a round shape display, from a material panel including the round shape display, the positioning panel being surrounded by a straight edge shaped linearly and a portion of an outer circumference of the round shape display, and the round shape display being shaped circularly and capable of displaying an image; (b) positioning the positioning panel based on the straight edge of the positioning panel; (c) attaching the polarizing plate shaped circularly to the round shape display included in the positioning panel, so that a polarization axis of the polarizing plate is oriented in a predetermined direction; and (d) removing a portion, of the positioning panel, including the straight edge, and producing the round shape display.

(2) Furthermore, another embodiment of the disclosure includes the feature (1). In the embodiment, the positioning panel includes a half of the outer circumference of the round shape display and a half of a circumscribed square including the round shape display, and an orientation of a line connecting two points of contact positioned on a boundary between the half of the outer circumference and the half of the circumscribed square is aligned with an orientation of the polarization axis.

(3) Still another embodiment of the disclosure is directed to a method of producing a round shape display including a polarizing plate, the round shape display being shaped circularly and having a front face provided with the polarizing plate. The method includes steps of: (a) positioning a material panel having a straight edge shaped linearly and including a round shape display shaped circularly and capable of displaying an image, the material panel being positioned based on the straight edge; (b) attaching, to the round shape display included in the material panel, the polarizing plate larger than the round shape display and having a slit shaped into a loop, so that a polarization axis of the polarizing plate is oriented in a predetermined direction and the slit is positioned along an outer circumference of the round shape display; (c) removing, after step (b), an area of the polarizing plate other than an area surrounded by the slit; and (d) removing a portion, of the material panel, including the straight edge, and producing the round shape display.

(4) Furthermore, another embodiment of the disclosure includes the feature (3). In the embodiment, the polarizing plate larger than the round shape display has a polarizing plate straight edge, so that, when the polarizing plate straight edge and the straight edge of the material panel are laid over each other, the polarization axis is oriented in the predetermined direction.

(5) Furthermore, still another embodiment of the disclosure includes any one of the features (1) to (4). In the embodiment, the material panel is a mother substrate separated, the mother substrate including a plurality of round shape display.

Advantageous Effects of Disclosure

The disclosure provides a round shape display including a polarizing plate which is less likely to cause displacement even if the display and the polarizing plate are both circular.

DESCRIPTION OF THE PREFERRED EMBODIMENTS

First Embodiment

Figure 2:
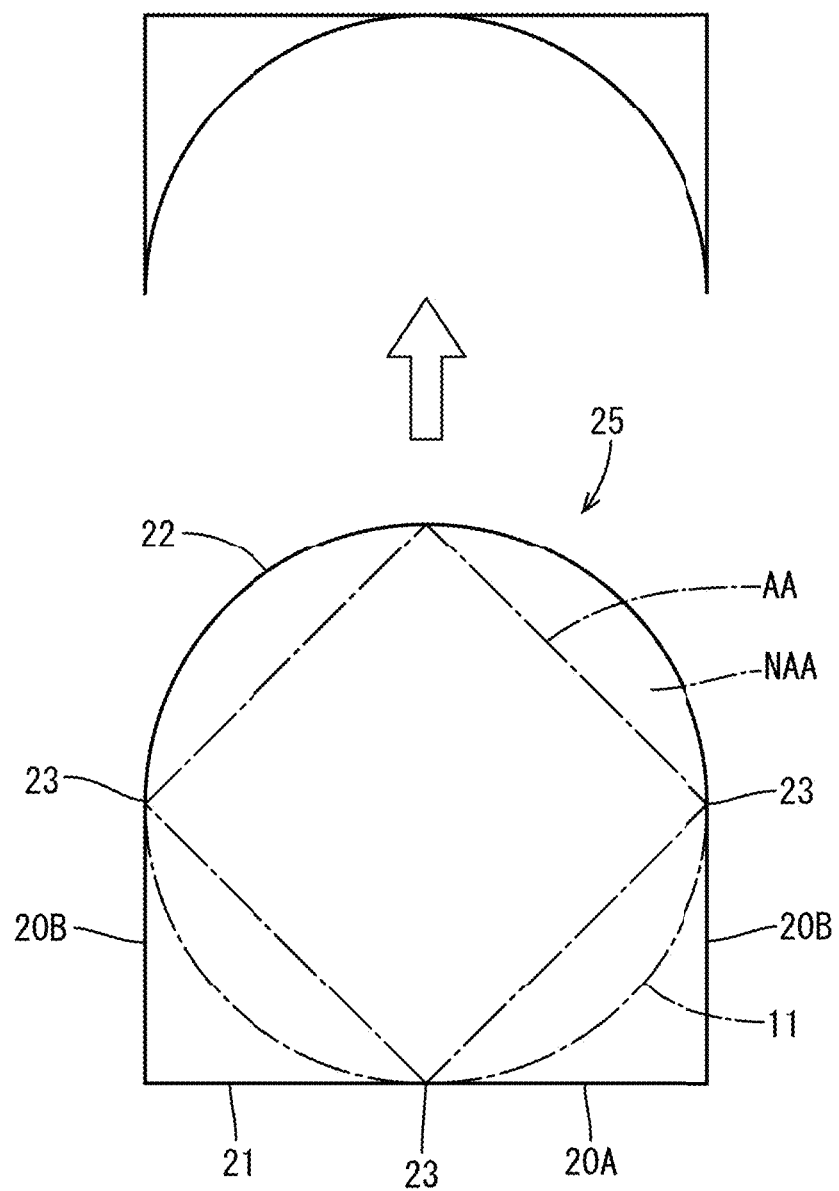
FIG. 2 is a plan view of a positioning panel to be produced in producing the positioning panel.
Figure 3:
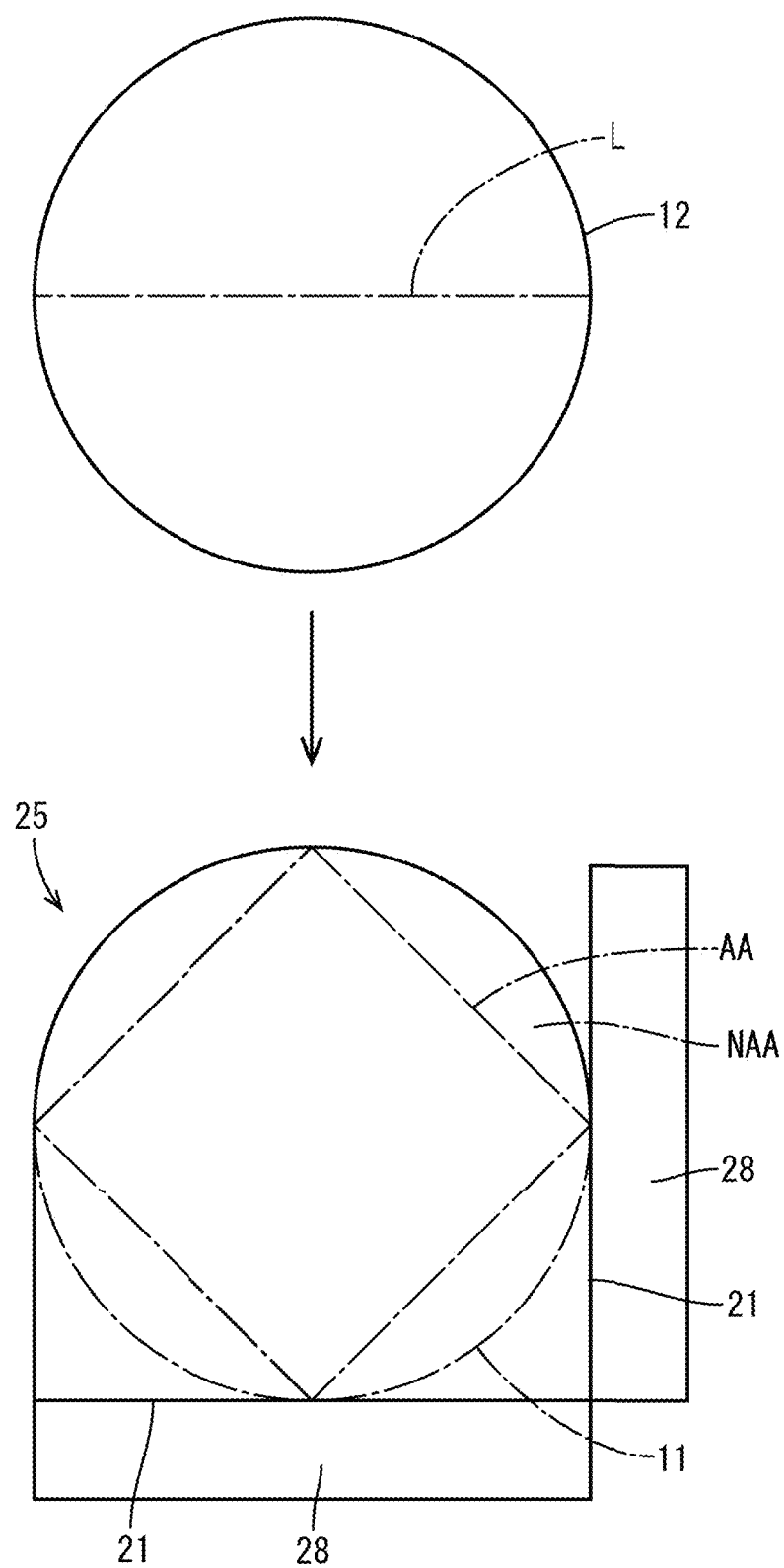
FIG. 3 is a plan view of the positioning panel positioned and a polarizing plate.
Figure 4:
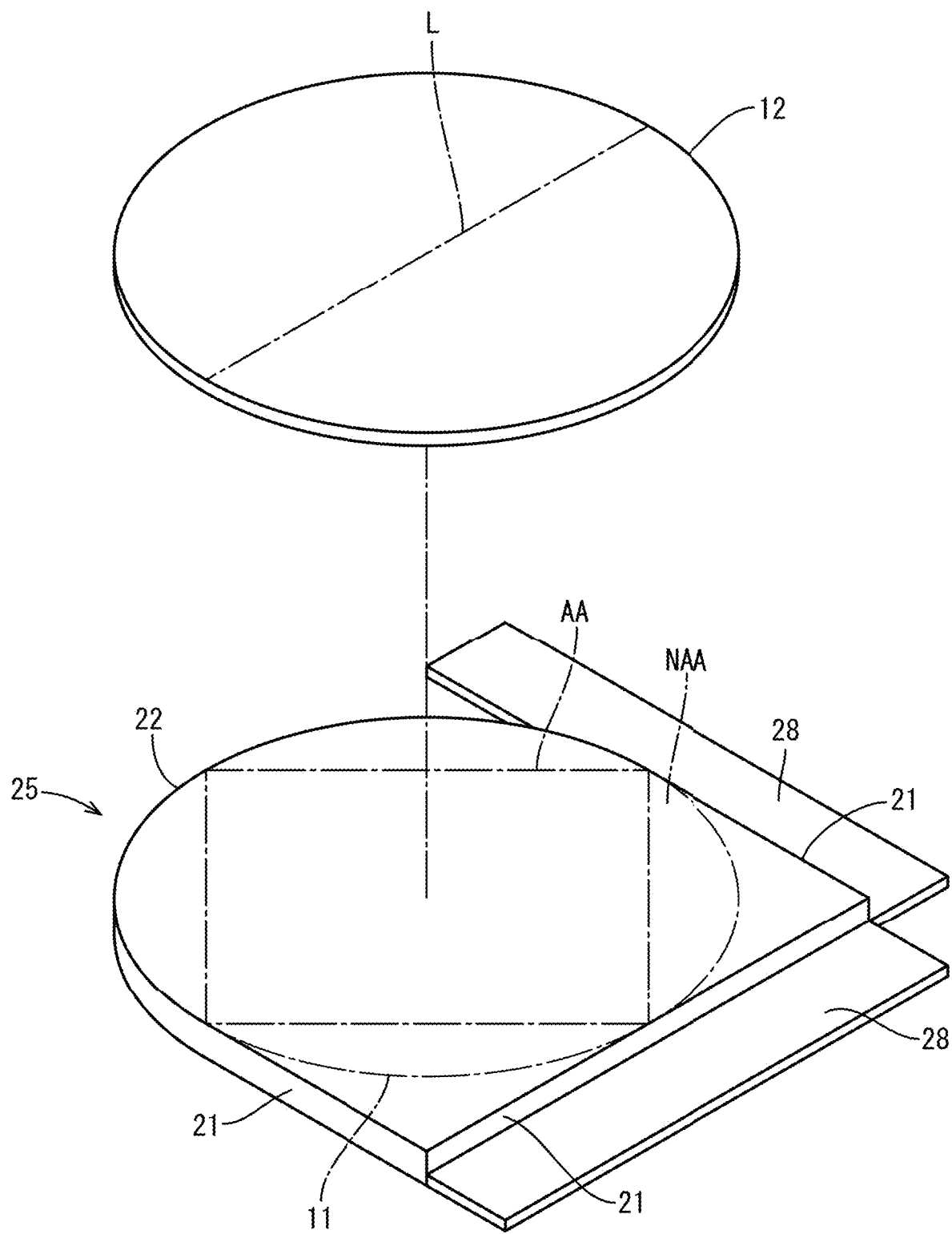
FIG. 4 is a perspective view of the positioning panel positioned and the polarizing plate.
Figure 5:
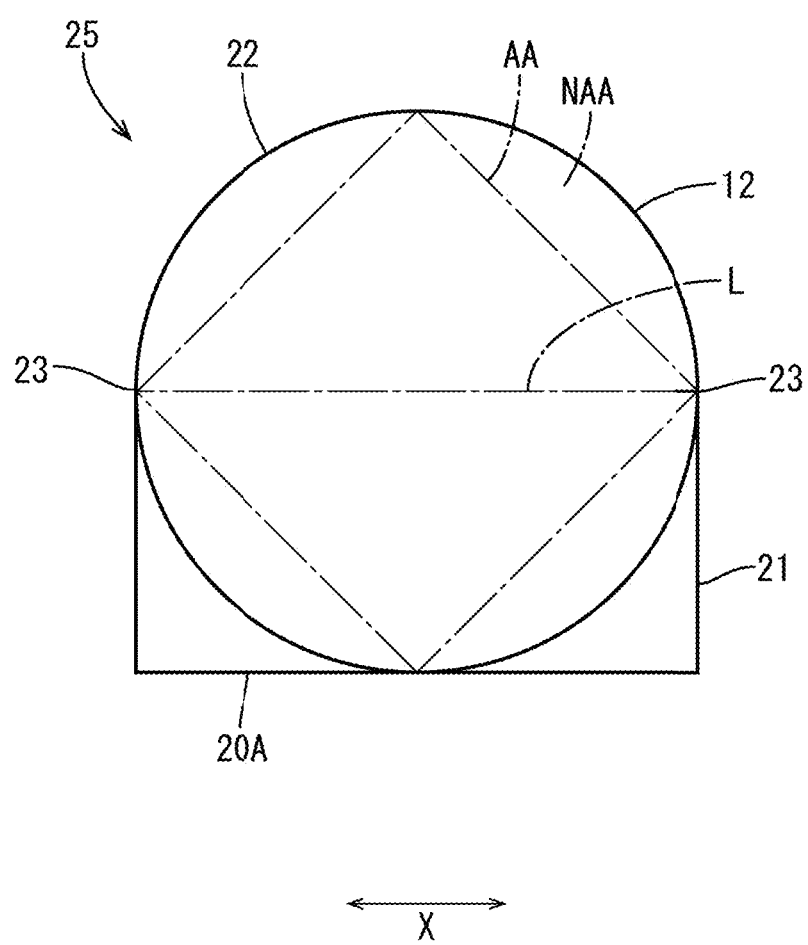
FIG. 5 is a plan view of the positioning panel and the polarizing plate after attaching.
Figure 6:
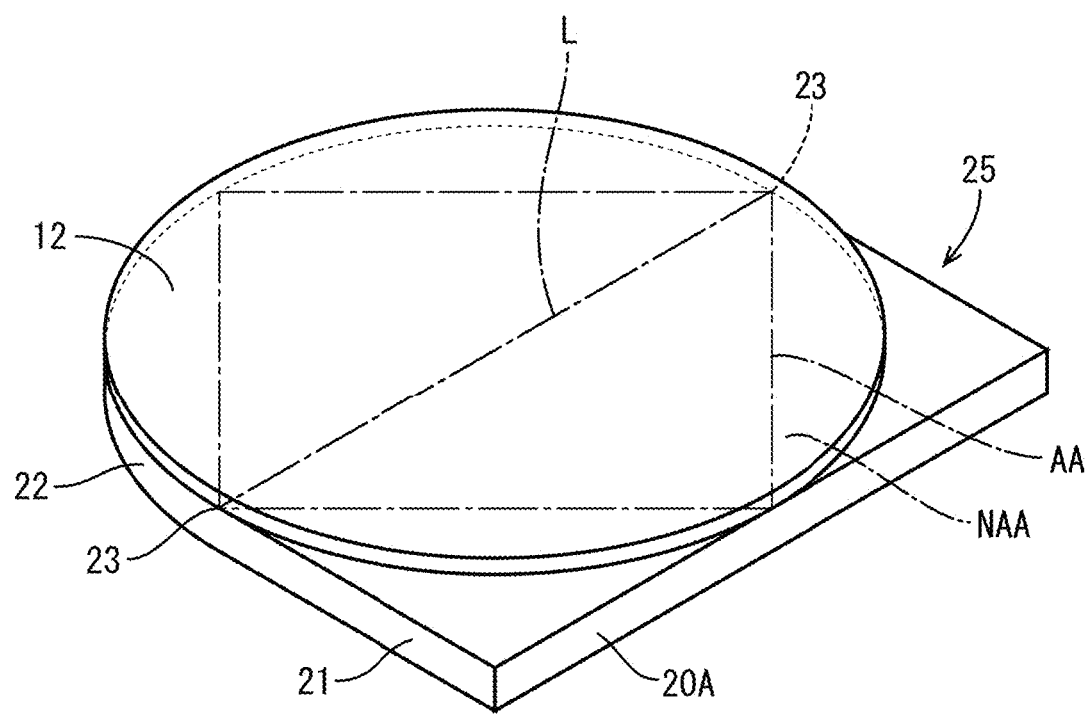
FIG. 6 is a perspective view of the positioning panel and the polarizing plate after attaching.
Figure 7:
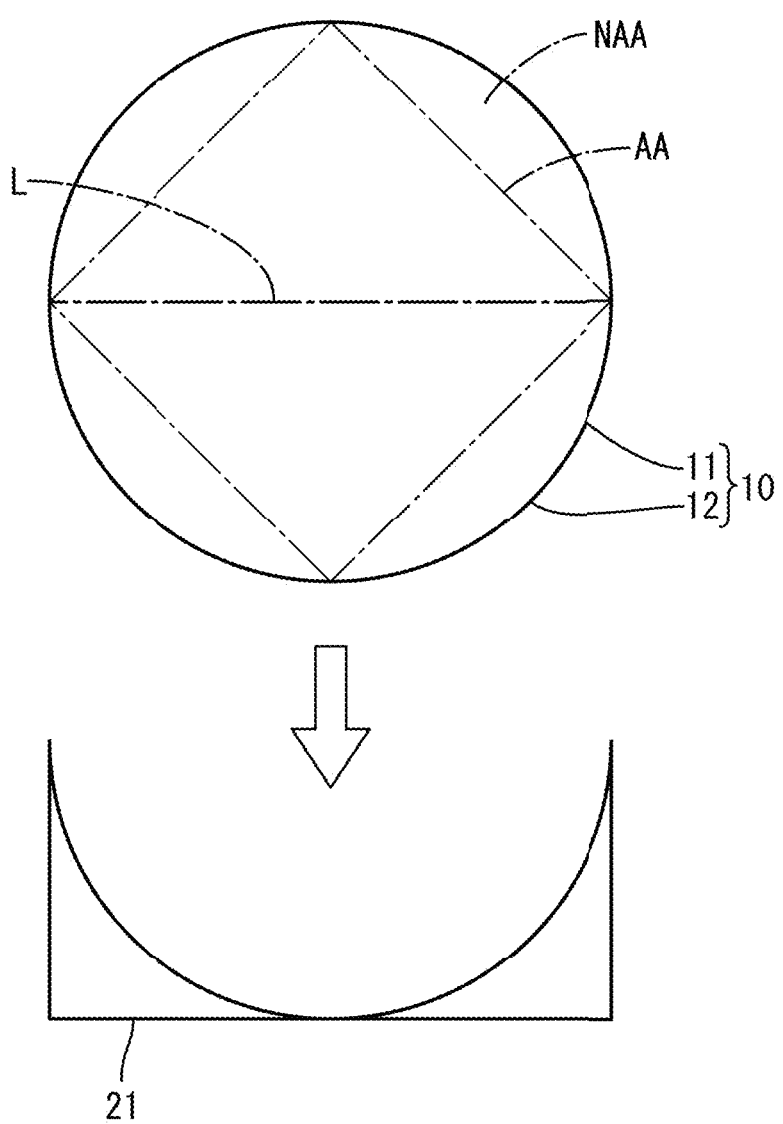
FIG. 7 is a plan view of a polarizing-plate-including round shape liquid crystal panel in producing a round shape display.

Described below is a polarizing-plate-including round shape liquid crystal panel (an example of a round shape display including a polarizing plate) 10 according to a first embodiment with reference to FIGS. 1 to 8. In the descriptions below, the top and the bottom of FIG. 4 are respectively referred to as the front and the back. As to identical components, one of such components has a reference sign. The sign can be omitted from the other components. Moreover, if the polarizing-plate-including round shape liquid crystal panel 10 and a round shape liquid crystal panel 11 included in the polarizing-plate-including round shape liquid crystal panel 10 have overlapping features, such features can be described for either one of the panels alone for the sake of convenience.

The polarizing-plate-including round shape liquid crystal panel 10 according to this embodiment is assembled to, for example, a dashboard of a car. The polarizing-plate-including round shape liquid crystal panel 10 is a part of an instrument panel, and capable of displaying some of instruments, various warning images, an image of a map in a car navigation system, and an image captured by a vehicle-installed camera. Note that the technique of the polarizing-plate-including round shape liquid crystal panel 10 is applicable not only to the above uses but also various uses.

The round shape liquid crystal panel 11 included in the polarizing-plate-including round shape liquid crystal panel 10 is not shown in details. Having a known configuration, the round shape liquid crystal panel 11 includes: a pair of transparent glass substrates (having high light transparency) attached together with a predetermined clearance provided therebetween; and a liquid crystal layer placed between the glass substrates. One of the glass substrates includes, for example: a source interconnect and a gate interconnect intersecting each other; a switching element (a TFT, for example) connected to the source interconnect and the gate interconnect; a pixel electrode connected to the switching element; and, in addition, an alignment film. Another one of the glass substrates includes, for example: a color filter having coloring units such as R (red), G (green), and B (blue) placed in a predetermined arrangement; a counter electrode; and, in addition, an alignment film. The source interconnect, the gate interconnect, and the counter electrode are supplied with image data and various kinds of control signals from a drive circuit board. The data and the signals are required to display an image.

Figure 8:
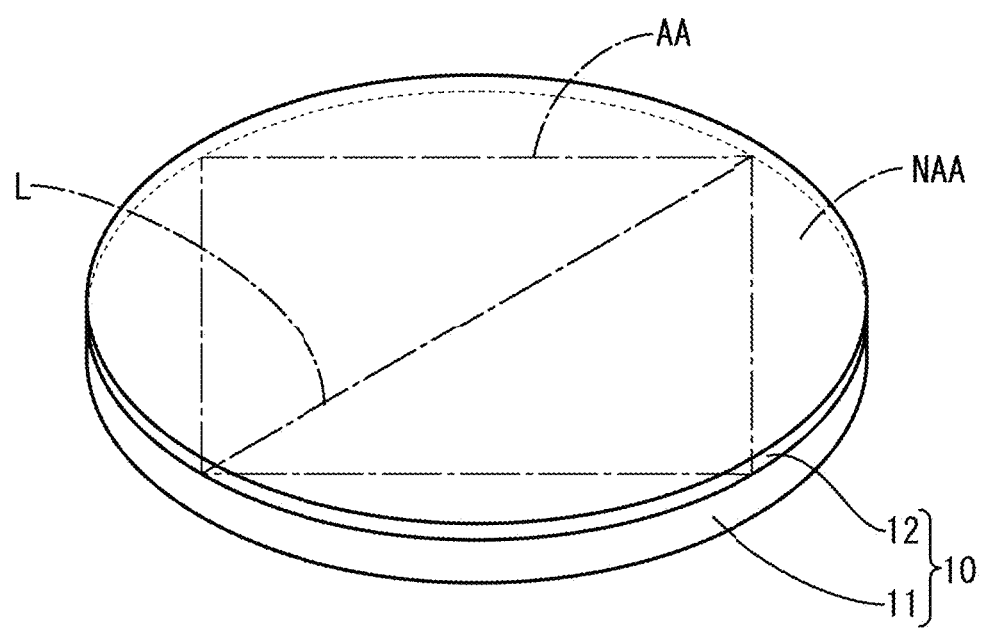
FIG. 8 is a perspective view of the polarizing-plate-including round shape liquid crystal panel.

As a whole, the round shape liquid crystal panel 11 is shaped circularly in planar view. As illustrated in FIG. 8, the round shape liquid crystal panel 11 is divided into: an active area AA (an area defined by a dot-dash line in FIG. 8) shaped into a square (a rectangle) and capable of displaying an image; and a non-active area NAA surrounding the active area AA and incapable of displaying an image. In the back of the round shape liquid crystal panel 11, a back light apparatus is provided, for example, so that light is emitted from the back.

The round shape liquid crystal panel 11 has the front and back faces each provided with a polarizing plate 12, thus constituting the polarizing-plate-including round shape liquid crystal panel 10. The polarizing plate 12 is circular in planer view, and the same as or slightly smaller than the round shape liquid crystal panel 11. Each of the polarizing plates 12 is concentrically attached to one of the front and back faces of the round shape liquid crystal panel 11, and covers all of or substantially all of the front and back faces of the round shape liquid crystal panel 11. Note that, in the drawings, the polarizing plate 12 is illustrated only on one of the front and back faces of the round shape liquid crystal panel 11. The polarizing plate 12 on the other face shall be omitted.

As to the polarizing-plate-including round shape liquid crystal panel 10, when the polarizing plate 12 also shaped circularly is to be attached to the round shape liquid crystal panel 11, the round shape liquid crystal panel 11 would, for example, slightly rotate upon making contact with the polarizing plate 12, such that the round shape liquid crystal panel 11 and the polarizing plate 12 might be circumferentially displaced in relation to each other from a predetermined position; that is, angularly displaced. The polarizing plate 12 has a polarization axis L. The displacement between the round shape liquid crystal panel 11 and the polarizing plate 12 deteriorates an optical property of light passing through the polarizing plate 12.

In order to overcome the problem, the polarizing-plate-including round shape liquid crystal panel 10 according to this embodiment is produced as described below to reduce the displacement from the predetermined position. Described below in detail is a method of producing the polarizing-plate-including round shape liquid crystal panel 10.

Figure 1:
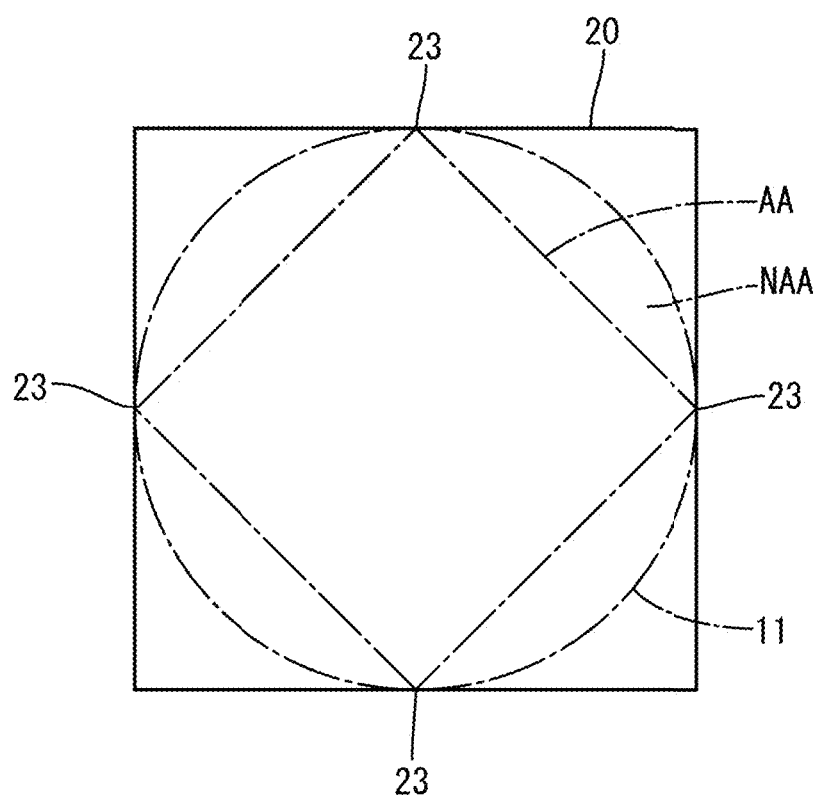
FIG. 1 is a plan view of a material panel according to a first embodiment.

First, as illustrated in FIG. 1, using a blade or a laser beam, an area including the round shape liquid crystal panel 11 is cut out of a material panel 20 including the round shape liquid crystal panel 11 and shaped into a square flat plate in planar view. (Producing a positioning panel. See FIG. 2.) Specifically, the material panel 20 is shaped into a square a side of which is as long as the diameter of the round shape liquid crystal panel 11 in planar view. In other words, the material panel 20 is a circumscribed square including the round shape liquid crystal panel 11 in planar view. Each of the sides of the material panel 20 in the longitudinal direction has a midpoint (a point which bisects the side) on an outer circumference of the round shape liquid crystal panel 11. Hereinafter, the point is referred to as a point of contact 23. As illustrated in FIG. 2, the cut-out liquid crystal panel includes a half of the outer circumference of the round shape liquid crystal panel 11 and a half of an outer periphery of the above circumscribed square. As a whole, the cut-out liquid crystal panel is shaped domical with a base. Hereinafter, the cut-out area of the material panel 20 shaped domical with a base is referred to as a positioning panel 25. The positioning panel 25 includes a straight edge 21 shaped linearly. The straight edge 21 is formed of a U-shaped end edge of the circumscribed square. The U-shaped end edge includes a side 20A (an end edge), and a pair of half-sides (end edges) 20B positioned on opposing ends of the side 20A. In addition, the rest of the positioning panel 25 is a curbed edge 22 including a half of the outer circumference of the round shape liquid crystal panel 11. Note that the above active area AA is inside the area defined by the connected four points of contact 23.

Next, based on the straight edge 21 of this positioning panel 25, the position and orientation of the positioning panel 25 are determined and maintained. (Positioning.) As illustrated in FIGS. 3 and 4, for example, the straight edge 21 of the positioning panel 25 is fitted to two positioning jigs 28, so that the positioning panel 25 is maintained in a predetermined position and orientation. The two jigs 28, each having an area shaped linearly, are placed perpendicularly to each other. Hence, the position and orientation of the round shape liquid crystal panel 11 included in the positioning panel 25 are determined and maintained. Then, as described above, the polarizing plate 12 shaped circularly in a predetermined size is attached to the round shape liquid crystal panel 11 included in the positioning panel 25, so that the polarization axis L of the polarizing plate 12 is oriented in a predetermined direction with respect to the positioning panel 25. (Attaching. See FIGS. 5 and 6.) In this embodiment, the term "predetermined direction" indicates the case where the polarization axis L is positioned in parallel with the side 20A (the side on the bottom in FIG. 5) of the positioning panel 25. The positioning panel 25 has the straight edge 21 fitted to the positioning jigs 28, keeping the round shape liquid crystal panel 11 included in the positioning panel 25 from rotating out of the predetermined position (direction). Such a feature makes it possible to position the polarizing plate 12 shaped circularly so that the polarization axis L of the polarizing plate 12 is oriented in the predetermined direction with respect to the round shape liquid crystal panel 11.

Note that the positioning panel 25 of the present embodiment is designed so that an orientation X of a line connecting two of the points of contact 23 positioned in opposing ends of the curbed edge 22 is aligned with an orientation X of the polarization axis L. Such a feature makes it possible to easily place the polarization axis L to be oriented in the predetermined direction. Moreover, the polarizing plate 12 is preferably provided with a mark to indicate the direction of the polarization axis L.

Finally, the polarizing-plate-including round shape liquid crystal panel 10 is cut out of the positioning panel 25 with a blade or a laser beam. (Producing a round shape display. See FIGS. 7 and 8.) That is, an area, of the positioning panel 25, including the straight edge 21 is removed, so that the polarizing-plate-including round shape liquid crystal panel 10 is cut out along the outer circumference of the round shape liquid crystal panel 11 included in the positioning panel 25. The above steps make it possible to obtain the polarizing-plate-including round shape liquid crystal panel 10 whose polarization axis L is not displaced with respect to the round shape liquid crystal panel 11.

Described next are advantageous effects of this embodiment. This embodiment is directed to a method of producing a polarizing-plate-including round shape liquid crystal panel 10, the liquid crystal panel 10 being shaped circularly and having a front face provided with a polarizing plate 12. In a stated order, the method includes steps of: (a) producing a positioning panel 25, including a round shape liquid crystal panel 11, from a material panel 20 including the round shape liquid crystal panel 11, the positioning panel 25 being surrounded by a straight edge 21 shaped linearly and a portion (a curbed edge 22) of an outer circumference of the round shape liquid crystal panel 11, and the round shape liquid crystal panel 11 being shaped circularly and capable of displaying an image; (b) positioning the positioning panel 25 based on the straight edge 21 of the positioning panel 25; (c) attaching the polarizing plate 12 shaped circularly to the round shape liquid crystal panel 11 included in the positioning panel 25, so that a polarization axis L of the polarizing plate 12 is oriented in a predetermined direction; and (d) removing a portion, of the positioning panel 25, including the straight edge 21, and producing the round shape liquid crystal panel 11

The producing method according to this embodiment allows for obtaining the polarizing-plate-including round shape liquid crystal panel 10 in which the round shape liquid crystal panel 11 and the polarization axis L of the polarizing plate 12 are less likely to be displaced (angularly displaced) in relation to each other, even if the liquid crystal panel 11 and the polarizing plate 12 are both shaped circularly. Moreover, before shaping the liquid crystal panel into a circle, a portion to be cut out is used as a basis for positioning, and the liquid crystal panel is cut out after the polarizing plate 12 is attached to the liquid crystal panel. Such features allow for the positioning with high accuracy without adversely affecting an exterior shape of the polarizing-plate-including round shape liquid crystal panel 10 in the finished state. As a result, the polarizing-plate-including round shape liquid crystal panel 10 with high quality of readout can be obtained.

The positioning panel 25 includes a half of the outer circumference (a curbed edge 22) of the round shape liquid crystal panel 11 and a half of a circumscribed square (a straight edge 21) including the round shape liquid crystal panel 11, and an orientation X of a line connecting two points of contact 23 positioned on a boundary between the half of the outer circumference and the half of the circumscribed square is aligned with an orientation X of the polarization axis L. Using the points of contact 23, such a configuration allows for easily positioning the polarizing plate 12 with respect to the round shape liquid crystal panel 11 included in the positioning panel 25. Such a feature makes it possible to eliminate the need for special equipment for camera alignment, contributing to reduction in production costs.

Second Embodiment

Described next is a second embodiment with reference to FIGS. 9 to 15. Note that, in the descriptions below, features different from those in the first embodiment alone are to be described. As to the same components as those in the first embodiment, numeral signs of the components are those of identical components in the first embodiment with another 20 added to the number of the corresponding numeral sign.

A material panel 40 including a round shape liquid crystal panel 31 is shaped into a square flat plate in planar view. A side of material panel 40 is longer than the diameter of the round shape liquid crystal panel 31. The round shape liquid crystal panel 31 included in the material panel 40 has an outer circumference positioned internally away from a straight edge 41 shaped linearly on the material panel 40. On the back face of the material panel 40, for example, a groove 36 with a shallow depth is provided to correspond to the position of the outer circumference of the round shape liquid crystal panel 31. (See FIG. 15.)

Figure 9:
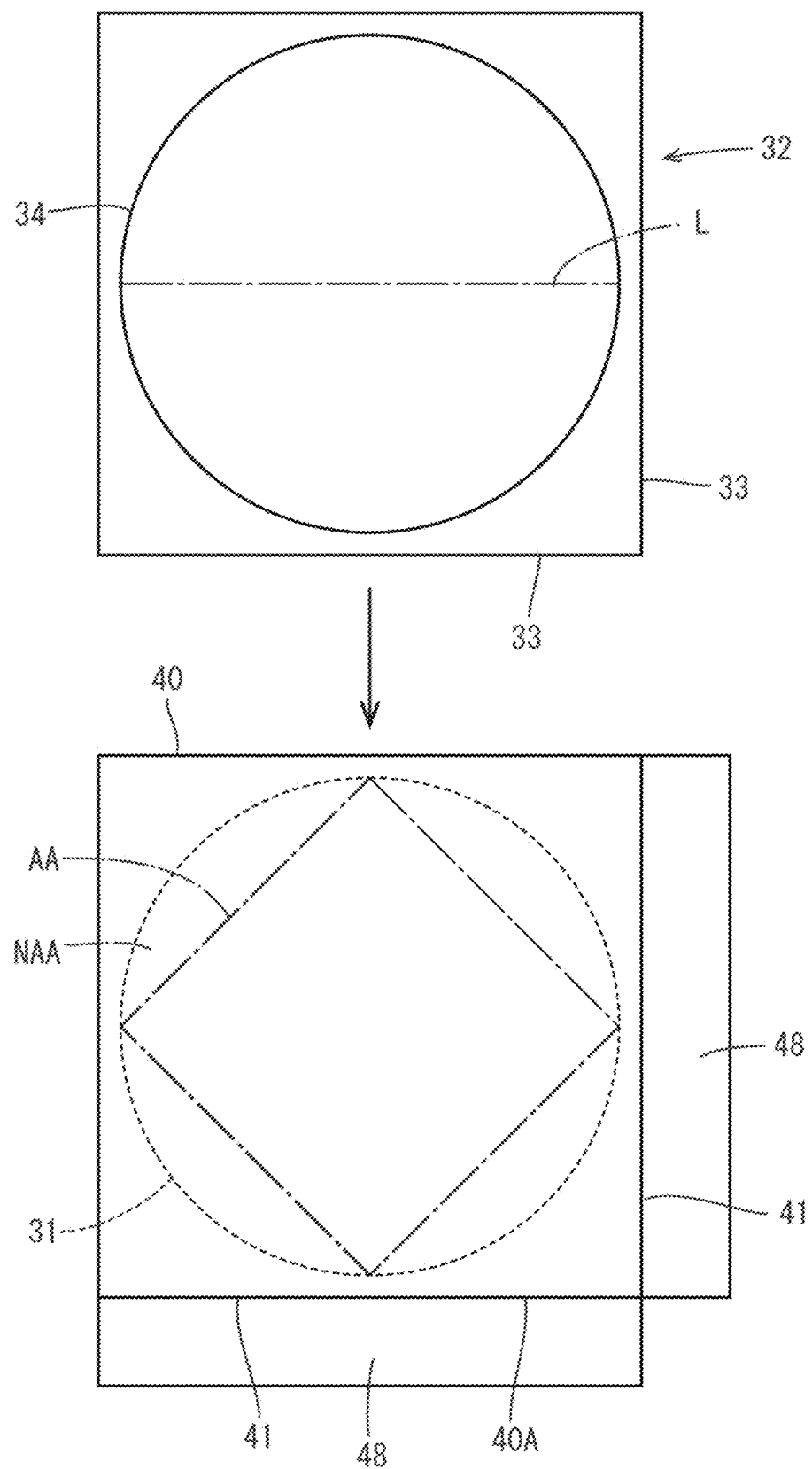
FIG. 9 is a plan view of a material panel positioned and a polarizing plate according to a second embodiment.
Figure 10:
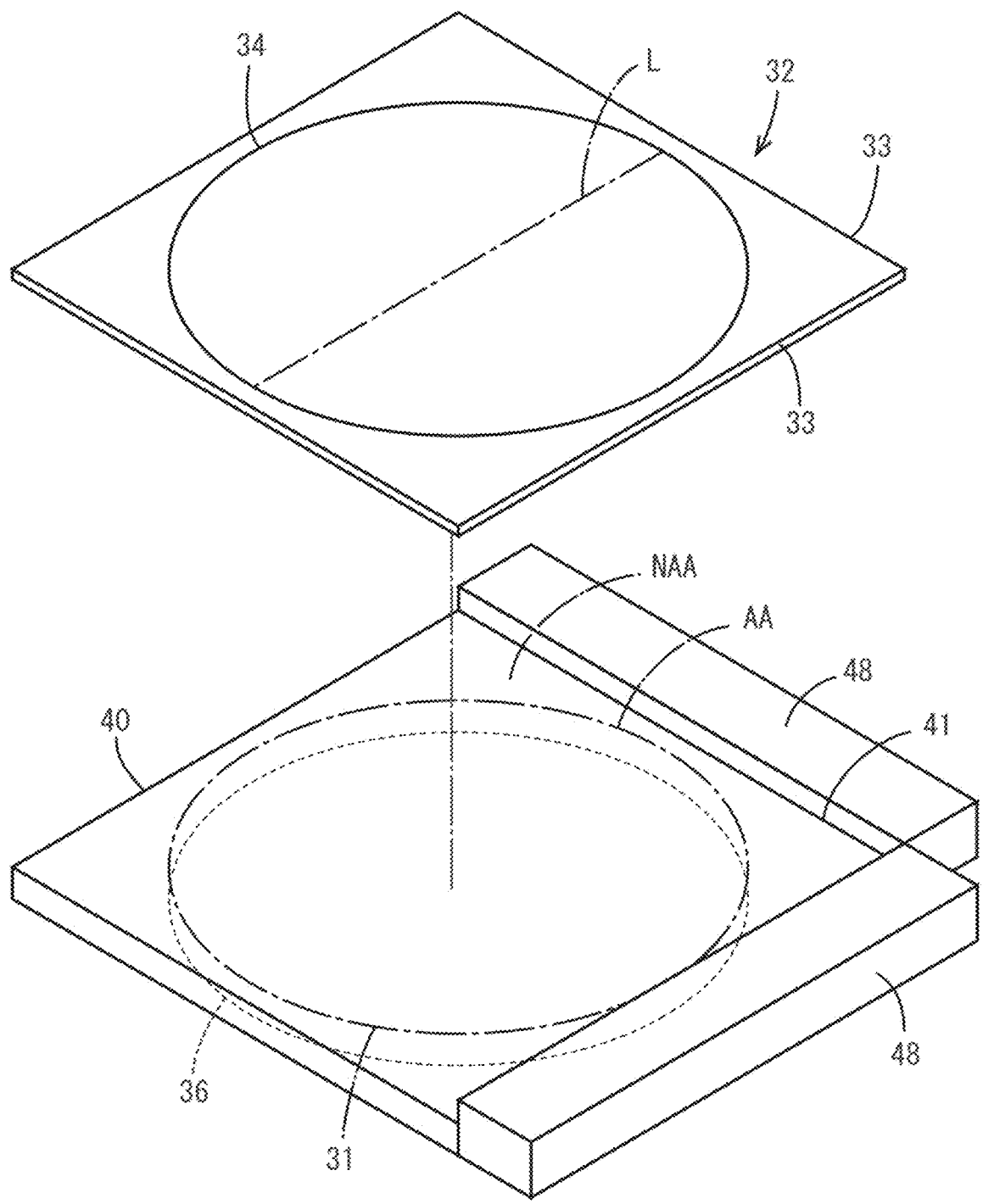
FIG. 10 is a perspective view of the material panel positioned and the polarizing plate.
Figure 11:
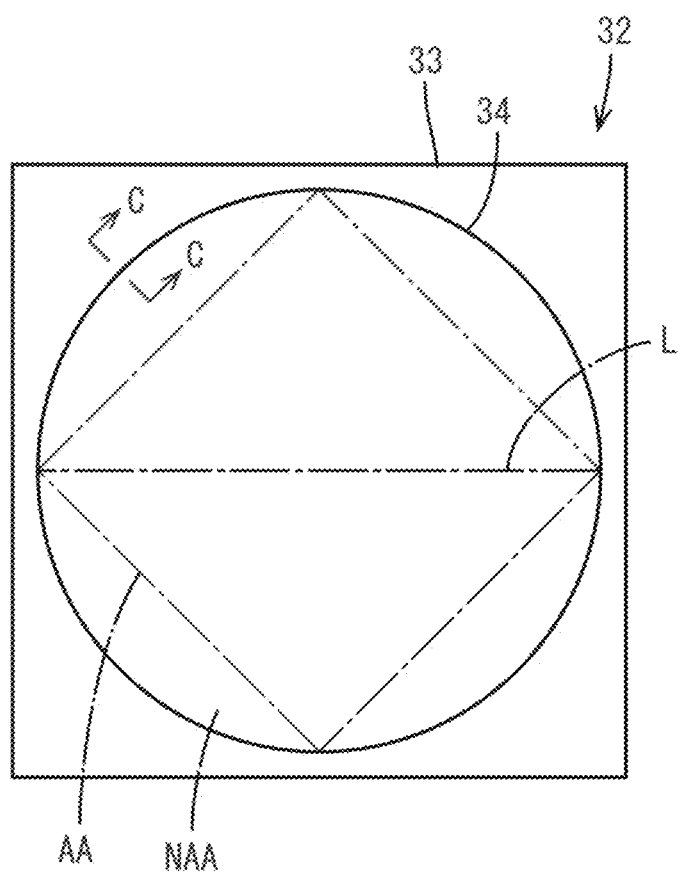
FIG. 11 is a plan view of the material panel and the polarizing plate after attaching.
Figure 12:
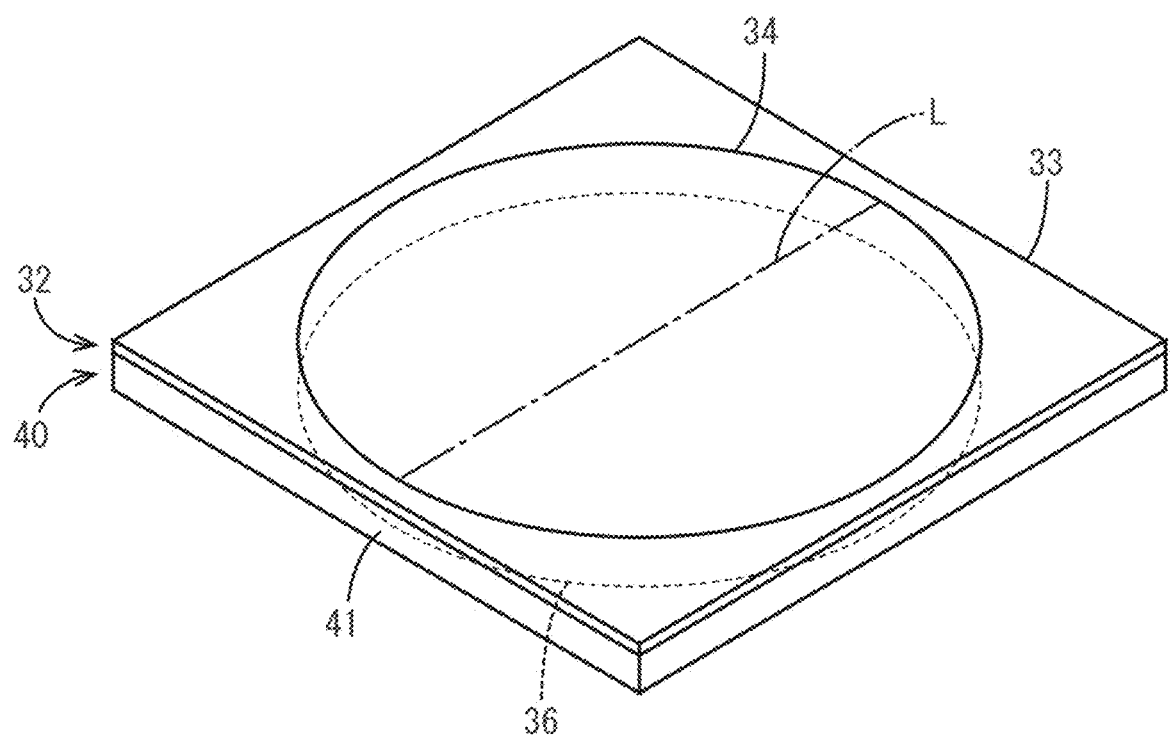
FIG. 12 is a perspective view of the material panel and the polarizing plate after attaching.
Figure 13:
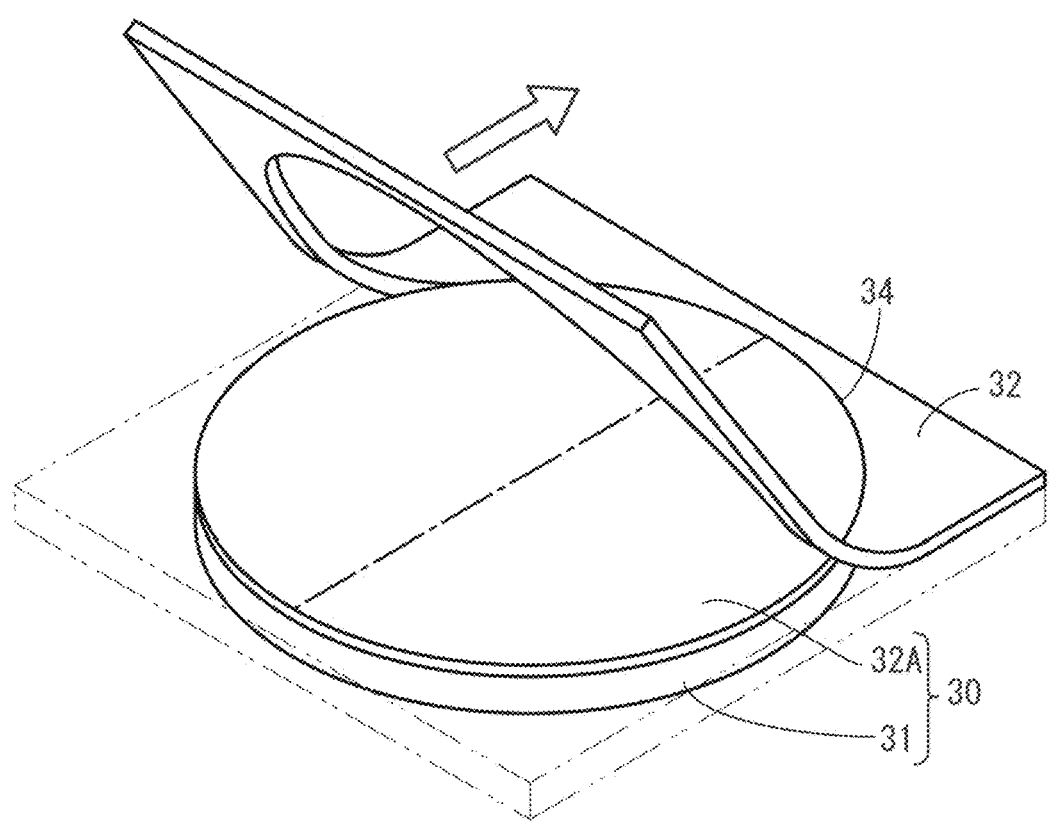
FIG. 13 is a perspective view of a polarizing-plate-including round shape liquid crystal panel in producing the round shape liquid crystal panel and removing.
Figure 13:
Figure 13:
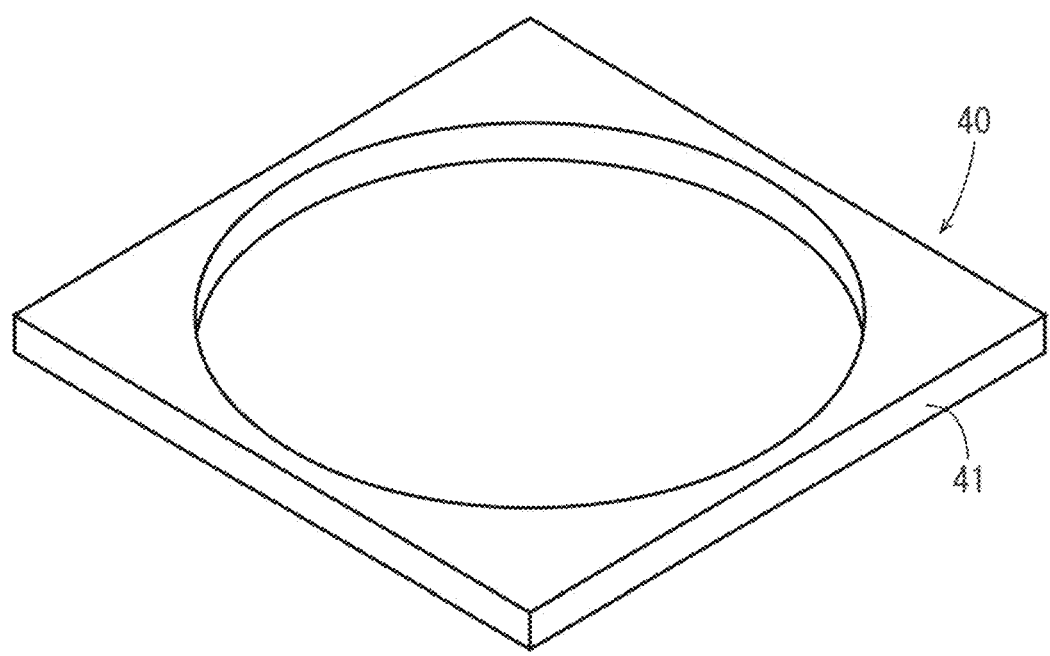
Figure 14:
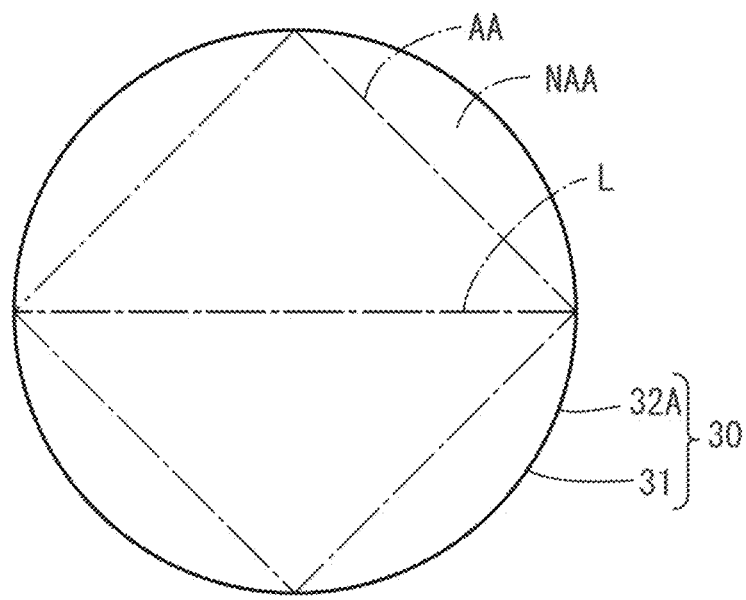
FIG. 14 is a plan view of the polarizing-plate-including round shape liquid crystal panel.
Figure 15:
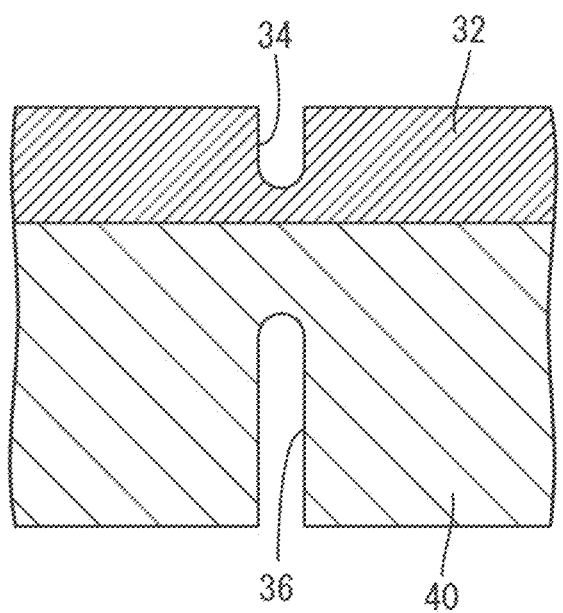
FIG. 15 is a cross-sectional view taken from line C-C of FIG. 11.

In this embodiment, first, based on a straight edge 41 of the material panel 40, the position and orientation of the material panel 40 are determined and maintained. (Positioning.) As illustrated in FIGS. 9 and 10, for example, the straight edge 41 of the material panel 40 is fitted to two positioning jigs 48, so that the material panel 40 is maintained in a predetermined position and orientation. The two jigs 48, each having an area shaped linearly, are placed perpendicularly to each other. Hence, the position and orientation of the round shape liquid crystal panel 31 included in the material panel 40 are determined and maintained.

Next, a polarizing plate 32 is attached to this material panel 40 such that the polarization axis L of the polarizing plate 32 is oriented in a predetermined direction with respect to the round shape liquid crystal panel 31 included in the material panel 40. (Attaching.) The polarizing plate 32 in this embodiment is the same in dimension as the material panel 40. Based on a polarizing plate straight edge 33 provided to the polarizing plate 32, the position and orientation of the polarizing plate 32 can be easily determined, as those of the material panel 40 are easily determined. In this embodiment, the polarization axis L is oriented in a predetermined direction in the case where the polarization axis L is positioned in parallel with a side 40A of the material panel 40 illustrated on the bottom of FIG. 9. In the attaching, the material panel 40 has the straight edge 41 fitted to the positioning jigs 48, keeping the round shape liquid crystal panel 31 included in the material panel 40 from rotating out of the predetermined position (direction), thereby reducing the risk of angular displacement.

Moreover, in this embodiment, with the material panel 40 and the polarizing plate 32 attached together in an appropriate position, the polarizing plate 32 is provided with a slit 34 in association with a position of the round shape liquid crystal panel 31. The slit 34 is shaped into a circular loop along the outer circumference of the round shape liquid crystal panel 31. (See FIG. 12.) An area (a round shape polarizing plate 32A) surrounded by the slit 34 may be as large as, or slightly larger than, or slightly smaller than the round shape liquid crystal panel 31.

Next, the round shape liquid crystal panel 31 is stamped out of the material panel 40 with the polarizing plate 32 laid thereon, and an exterior area of the material panel 40 including the straight edge 41 is removed. That is, the round shape liquid crystal panel 31 is produced. (Producing round shape liquid crystal panel.) Here, taking advantage of expansion and contraction in autoclaving, the groove 36 provided to the back face of the material panel 40 makes it possible to easily stamp out the round shape liquid crystal panel 31 in a desired circular shape.

Simultaneously, the slit 34 is broken, and an area other than the area (the round shape polarizing plate 32A) surrounded by the slit 34 is removed together with the exterior area of the material panel 40 circularly stamped out. (Removing.) Here, the polarizing plate 32 is easily separated with the slit 34 into the round shape polarizing plate 32A and the area other than the round shape polarizing plate 32A. Hence, a round shape liquid crystal display 30 including a polarizing plate according to this embodiment is produced. (See FIGS. 13 and 14.)

Described next are advantageous effects of this embodiment. This embodiment is directed to a method of producing a polarizing-plate-including round shape liquid crystal panel 30, the round shape liquid crystal panel 30 being shaped circularly and having a front face provided with a round shape polarizing plate 32A. The method includes steps of: (a) positioning a material panel 40 having a straight edge 41 shaped linearly and including a round shape display shaped circularly and capable of displaying an image, the material panel 40 being positioned based on the straight edge 41; (b) attaching, to the round shape display included in the material panel 40, the polarizing plate 32 larger than the round shape display and having a slit 34 shaped into a loop, so that a polarization axis L of the polarizing plate 32 is oriented in a predetermined direction and the slit 34 is positioned along an outer circumference of the round shape display; (c) removing, after step (b), an area of the polarizing plate 32 other than an area (the round shape polarizing plate 32A) surrounded by the slit 34; and (d) removing a portion, of the material panel 40, including the straight edge 41, and producing the round shape display In a similar manner as the first embodiment, the producing method in this embodiment also allows for obtaining the polarizing-plate-including round shape liquid crystal panel 30 which is less likely to suffer from angular displacement even if the liquid crystal panel 31 and the polarizing plate 32 are circular.

Furthermore, the polarizing plate 32 larger than the round shape liquid crystal panel 31 has the polarizing plate straight edge 33. When the polarizing plate straight edge 33 and the straight edge 41 of the material panel 40 are laid over each other, the polarization axis L of the polarizing plate 32 is oriented in a predetermined direction.

In this configuration, the material panel 40 is provided with a straight edge 41 shaped linearly, and the polarizing plate 32 is also provided with the polarizing plate straight edge 33 shaped linearly. Using these straight edges 41 and 33, the polarizing plate 32 can be easily positioned with respect to the material panel 40. Because the polarization axis L of the polarizing plate 32 is previously oriented in a predetermined direction, the polarization axis L is easily positioned.

Other Embodiments

The disclosure shall not be limited to the embodiments described above with reference to the drawings. Other exemplary embodiments below are also included in the technical scope of the disclosure.

(1) The above embodiments exemplify a liquid crystal panel including: a pair of substrates; and a liquid crystal layer provided between, and supported by, the substrates. Alternatively, the display panel may include, instead of a liquid crystal material, a functionally organic molecule to be supported between the pair of substrates.

(2) The second embodiment involves simultaneously stamping out the round shape liquid crystal panel 31 (producing a round shape liquid crystal panel) and separating the slit 34. Alternatively, the stamping and the separating do not have to be simultaneously carried out, or may be sequentially carried out.

(3) The material panels 20 and 40 described above may be a so-called mother substrate separated, the mother substrate having many round shape liquid crystal panels. Moreover, in the first embodiment, the mother substrate does not have to be separated. Instead, a positioning panel may be directly produced from the mother substrate.

(4) In the first embodiment, the positioning panel 25 does not have to be limited to the above configuration. For example, straight edges between neighboring points of contact are used as a positioning edge, and the rest of the edges of the positioning panel 25 may constitute ¾ of the outer circumference of the round shape liquid crystal panel.

(5) In the second embodiment, a polarizing plate including many round shape polarizing plates 32A is attached at once to a mother substrate including many round shape liquid crystal panels 31. Then, unnecessary portions may be removed.

What is claimed is:

1. A method of producing a round shape display including a polarizing plate, the round shape display being shaped circularly and having a front face provided with the polarizing plate, the method comprising, in a stated order, steps of:
    (a) producing a positioning panel, including a round shape display, from a material panel including the round shape display, the positioning panel being surrounded by a straight edge shaped linearly and a portion of an outer circumference of the round shape display, and the round shape display being shaped circularly and capable of displaying an image;
    (b) positioning the positioning panel based on the straight edge of the positioning panel;
    (c) attaching the polarizing plate shaped circularly to the round shape display included in the positioning panel, so that a polarization axis of the polarizing plate is oriented in a predetermined direction; and
    (d) removing a portion, of the positioning panel, including the straight edge, and producing the round shape display.

2. The method according to claim 1, wherein
the positioning panel includes a half of the outer circumference of the round shape display and a half of a circumscribed square including the round shape display, and an orientation of a line connecting two points of contact positioned on a boundary between the half of the outer circumference and the half of the circumscribed square is aligned with an orientation of the polarization axis.

3. A method of producing a round shape display including a polarizing plate, the round shape display being shaped circularly and having a front face provided with the polarizing plate, the method comprising steps of:
    (a) positioning a material panel having a straight edge shaped linearly and including a round shape display shaped circularly and capable of displaying an image, the material panel being positioned based on the straight edge;
    (b) attaching, to the round shape display included in the material panel, the polarizing plate larger than the round shape display and having a slit shaped into a loop, so that a polarization axis of the polarizing plate is oriented in a predetermined direction and the slit is positioned along an outer circumference of the round shape display;
    (c) removing, after step (b), an area of the polarizing plate other than an area surrounded by the slit; and
    (d) removing a portion, of the material panel, including the straight edge, and producing the round shape display.

4. The method according to claim 3, wherein
the polarizing plate larger than the round shape display has a polarizing plate straight edge, so that, when the polarizing plate straight edge and the straight edge of the material panel are laid over each other, the polarization axis is oriented in the predetermined direction.

5. The method according to claim 1, wherein
the material panel is a mother substrate separated, the mother substrate including a plurality of round shape display.

* * * * *